(12) United States Patent
Lohr

(10) Patent No.: US 6,351,626 B1
(45) Date of Patent: Feb. 26, 2002

(54) SYSTEM FOR NONCONTACTING OF ELECTRICAL ENERGY OR ELECTRICAL SIGNALS

(75) Inventor: Georg Lohr, Eichenau (DE)

(73) Assignee: Schleifring und Apparatebau GmbH (DE)

( * ) Notice: Subject to any disclaimer, the term of this patent is extended or adjusted under 35 U.S.C. 154(b) by 0 days.

(21) Appl. No.: 09/331,845

(22) PCT Filed: Jan. 16, 1998

(86) PCT No.: PCT/DE98/00141

§ 371 Date: Aug. 19, 1999

§ 102(e) Date: Aug. 19, 1999

(87) PCT Pub. No.: WO98/32217

PCT Pub. Date: Jul. 23, 1998

(30) Foreign Application Priority Data

Jan. 16, 1997 (DE) .......................................... 197 01 357

(51) Int. Cl.⁷ ............................... G01B 7/30; H02J 7/00
(52) U.S. Cl. ..................... 455/41; 324/654; 324/207.25
(58) Field of Search ............................. 455/41; 363/20, 363/17

(56) References Cited

U.S. PATENT DOCUMENTS

| 4,223,313 A | * | 9/1980 | Chabrol | .................. | 340/870.07 |
| 6,040,986 A | * | 3/2000 | Sakamoto et al. | ............. | 363/20 |

FOREIGN PATENT DOCUMENTS

| EP | 0412421 A2 | 2/1991 |
| EP | 0440050 A2 | 8/1991 |
| JP | 5-6100368 | 12/1981 |

OTHER PUBLICATIONS

Clemens M. Zierhoffer et al., High–Efficiency Coupling––Insesnsitive Transcutaneous Power and Data Transmission Via an Inductive–IEEE Transactions on Biomedical Engineering vol. 37, No. 7 Jul. 1990.*

Clemens M. Zierhofer, et al., High–Efficiency Coupling–Insensitive Transcutaneous Power and Data Transmission Via an Inductive Link, *IEEE Transactions on Biomedical Engineering*, vol. 37, No. 7, Jul. 1990.

* cited by examiner

*Primary Examiner*—Daniel Hunter
*Assistant Examiner*—Alan T. Gantt
(74) *Attorney, Agent, or Firm*—St. Onge Steward Johnston & Reens LLC

(57) ABSTRACT

What is described here is a system for non-contact transmission of electrical energy or electrical signals, respectively, between parts mobile relative to each other, which comprises inductive or capacitive coupler elements which are supplemented by appropriately complementary dummy elements so as to form resonance circuits, and which are supplied by a switching or amplifying element, and wherein said switching or amplifying element is supplemented so as to form a power oscillator. The invention is distinguished by the provision that the resonance circuit employed for transmission is the frequency-determining circuit element and that a signaling means is provided which, on the basis of voltages and currents of said resonant elements, generates a secondary coupling signal for said switching or amplifying element such that oscillation will take place on at least one resonance frequency of said resonance circuits, and that moreover said signaling means is so designed that in the event of a series resonance it couples out a magnitude proportional to one part of a series resonance current, and in the event of a parallel resonance it couples out a magnitude proportional to one part of a parallel resonance voltage.

14 Claims, 1 Drawing Sheet

SYSTEM FOR NONCONTACTING OF ELECTRICAL ENERGY OR ELECTRICAL SIGNALS

DESCRIPTION

1. Field of the Invention

The invention relates to a system for non-contacting or contact-free transmission of electrical energy or electrical signals, respectively, between parts mobile relative to each other.

Such devices are used for the transmission of electrical signals or electrical energy, respectively, between two or more parts mobile relative to each other. This movement may be a rotating, a translational or a combined movement.

For the sake of easy understanding a distinction is not made in the present description between the transmission among units mobile relative to each other, on the one hand, and a stationary unit and units mobile relative thereto, on the other hand, because this is only a question of local relationship and does not take any influence on the operating mode of the inventive device. Equally, a further distinction is not made between the transmission of signals and the transmission of energy because the operating mechanisms are identical.

2. Prior art

In units adapted for a translational and particularly linear movement, such as hoisting and conveyor systems, and in rotatable units such as radar installations or even computer tomographs it is necessary to transmit electrical signals or power between units mobile relative to each other or between one stationary unit and at least one other unit arranged for movement relative thereto.

In those cases, for instance, where the relative speed of the units is comparatively high it is expedient to provide for a non-contact transmission. Compared against a contacting transmission, e.g. by means of sliding contacts, a non-contact transmission presents additional advantages when high data rates are to be communicated in the transmission of digital signals or when large bandwidths are required for the transmission of analog signals:

In conventional (circular) slip rings the diameter of the slip ring limits the maximum frequency which can be transmitted. This level is reached when the periphery of the slip ring corresponds to half the wavelength of the signals to be transmitted.

Devices for non-contact transmission of signals or electrical energy are known in the most different configurations, e.g. from the German Patent DE 30 43 441 A1 or the German Patent DE 42 36 340 C2:

In the system known from the German Patent DE 30 43 441 A2 for wireless transmission of energy inductive coupler elements are used which are supplemented by appropriate complementary dummy elements or capacitors so as to form resonant circuits, and which are supplied by a switching or amplifying element.

In the system known from the German Patent De 42 36 340 C2 for the inductive transmission of power in the range of mean frequencies from a primary coil disposed on a stator to a consumer equipped with at least one secondary coil, the primary coil consists of coils connected by groups in series, with one capacitor per group being connected in series. All of these groups are each connected in parallel to a medium-frequency distributing line, with the impedance of each group of coils and the respective capacitor being so dimensioned that in the event of inductive coupling of one group to one of the mobile consumers the resonance condition is satisfied at least approximately for this group.

Another system is known from the German Patent DE 33 31 722 A1. That known system comprises coupler elements on each part, whereof each comprises at least one electrode so that the signal will be transmitted by capacitance via the respectively opposite electrodes.

Another system with inductive transmission is described in the German Patent DE 28 45 438 A1.

The document IEEE TRANSACTIONS ON BIOMEDICAL ENGINEERING, vol. 37, No. 7 of Jul. 1, 1990, pages 716 to 722, discloses a system for non-contact: transmission of electrical energy or electrical signals, respectively, between parts mobile relative to each other, comprising inductive or capacitive coupler elements which are supplemented by complementary dummy elements so as to form resonance circuits and which are supplemented by a switching or amplifying element so as to constitute a power oscillator.

The circuit design chosen there is characterized by a comparatively loose coupling, requires at least two resonance circuits and is merely suitable to transmit low power. The selected arrangement of the feedback path Lf is inexpedient. The calculation of all necessary values, particularly the voltage, is consequently very expensive in terms of work.

In the European Patent 56 100 368 a digital system is described where an analog magnitude relating to the spacing is obtained by coupling out different resonances.

Other solutions have become known which will be briefly explained in the following with a view to the description of the invention. In this explanation merely those aspects will be considered which are definitely necessary for the understanding of the solution On principle, systems of the type which the introductory clause of claim 1 starts out from present an impedance with a significant imaginary part. In capacitive coupler systems this is due to the coupling capacity, which is restricted by the geometry, and in inductive systems it is due to the leakage inductance. The leakage inductance cannot be made optionally small because a certain gap always remains between the moving parts for mechanical reasons. Without additional provisions, the impedance present in the power circuit as a result of coupling inductance and capacity restricts the energy which can be transmitted.

As is described already in Meinke/Gundlach "Taschenbuch der Hochfrequenztechnik" [*Vademecum of High-Frequency Technology*], $3^{rd}$ edition, Springer-Verlag, 1968, such an imaginary impedance can be compensated by a second imaginary impedance of the same magnitude with an opposite sign.

In the event of inductive transmission this is also known by the term resonance transformer. In this respect reference is made to Meinke/Gundlach, page 186 (Resonance Transformers). For compensation an additional capacitor is added to an inductive transmitter element or an additional inductor is added to a capacitive transmitter element, thus supplementing the respective transmitter element to form a resonant circuit. At the resonance frequency the impedance of such a resonant circuit will tend towards infinity in the event of a parallel connection (parallel resonance) and towards zero in the event of a series resonance (series circuit).

Even though this; impedance thus does no longer take an influence on the transmission of power the mechanical tolerances are particularly problematic in the engineering implementation of such a system. As a result of a mutually relative movement or also of thermal expansion the inductance or the coupling capacitance will be subjected to at least slight variations.

When the circuit is now supplied by an oscillator operating at an invariable operating frequency such mechanical influences or even drift phenomena of the oscillator due to ageing and temperature may give rise to the occurrence of a variation from the oscillator operating frequency and the resonance frequency of the transmitting means.

In such a case the compensation of the dummy elements is no longer effective, and the transmitting means presents impedances which may substantially impair the transmission of energy.

Various provisions have become known as a solution to this problem, such as the application of a thermally stabilized quartz oscillator and a mechanical design of the transmitter element with extremely narrow tolerances. Another solution according to the German Patent DE 34 47 560 A11 consists of an oscillator which can be adjusted by means of capacitance diodes. Such solutions require a high expenditure in engineering provisions and result in a sensitive and unstable system.

BRIEF DESCRIPTION OF THE INVENTION

The present invention is based on the problem of improving a device for non-contact transmission of electrical energy or electrical signals between parts adapted for movement relative to each other, which comprises inductive or capacitive coupler elements which are supplemented by appropriate complementary dummy elements so as to form resonance circuits and which are supplied by a switching or amplifying element, respectively, in such a way that energy or signals may be transmitted over a wide range independently of environmental conditions, temperature and mechanical tolerances.

One inventive solution to this problem is defined in Patent claim 1. Improvements of the invention are the subject matters of the claims 2 et seq.

The invention starts out from the following fundamental idea:

An inductive or capacitive transmitter system which is supplemented so as to form a resonance circuit has its optimal transmission characteristics exclusively at the resonance frequency. In accordance with the invention therefore the circuit is supplemented to form a power oscillator in which the resonance circuit used for transmission is the frequency-determining circuit element. It is unimportant whether the resonance circuit of the transmitting element is a series or a parallel circuit. It may also be formed by further additional dummy elements so as to form a multi-circuit system able to resonate.

What is essential is the fact that the transmission system is so designed that it may be excited, by secondary coupling, to oscillate on at least one resonance frequency of the system at which energy can be transmitted.

The system comprises an amplifying element which supplies the resonant transmitter means. In a preferred embodiment a signaling means determines a signal from currents and voltages of the resonance elements which contains at least one phase information, and signals the latter to the amplifying element. In order to obtain a structure capable of resonating a switching or amplifying component is required in this arrangement, which will ensure such an amplification that the resonance condition (cf. Tietze, Schenk "Halbleiterschaltungstechnik" [*the technology of semiconductor circuitry*], Springer-Verlag, $10^{th}$ edition, p. 459) sill be satisfied. Whether the switching or amplifying component is designed here as pure semiconductor switch or as a linear amplifier element does not take any influence on the functionality of the inventive system.

For this reason a distinction will not be made between a switch and an amplifier in the following.

In a particularly expedient embodiment of the invention the signaling means comprises a power tap, in the event of a series resonance, which couples a predetermined share of the resonance current out. This power tap may be a current-metering resistor, a power transformer or a Hall element, for instance, The resonance current may equally be measured as voltage drop across one of the resonance elements.

In another advantageous embodiment of the invention the signaling means comprises—in the event of parallel resonance components for coupling a predetermined share of the voltages out which are applied to the parallel resonance circuit. These voltages may also be indirectly determined via the current flowing through these elements.

In another expedient embodiment of the invention the signaling means comprises in the case of a multi-circuit resonance system—components for determining the combination of a predetermined share of at lest one parallel resonance voltage or a predetermined share of at least one series resonance current. In this system the signaling means may be so implemented that the evaluation may be made by a simple in-phase addition of these magnitudes. With these provisions it is possible to have the circuit operate at series or parallel resonance, depending on the respective load case.

In an alternative one can also implement a reversing switch for recognising whether a series or parallel resonance is present, and for an appropriate determination of a share of the resonance voltage or resonance current, respectively. In a further expedient embodiment of the invention the signaling means comprises filter elements for pre-selection between resonance voltage or current tapping.

In another advantageous embodiment of the invention the signaling means comprises an auxiliary oscillator which facilitates the commencement of oscillation of the system when the supply voltage is turned on. It is common that upon turn-on of the supply voltage an oscillator begins to oscillate from the noise condition. To ensure a reliable and rapid start of the oscillation such an oscillator can also receive a starting signal at a predetermined frequency. When this frequency is selected in the vicinity of the desired operating frequency the oscillation commences particularly rapidly. In the case of several possible resonances, too, the oscillation can take place at the desired resonance frequency when the starting signal is determined. If in such a case the oscillator started to oscillate from the noise condition it may be that the power oscillator also starts to oscillate to undesirable resonance frequencies.

In another expedient embodiment of the invention a further analyzer unit is provided which uses the operating frequency of the circuit as such for determining the spacing between the parts movable relative to each other. With the operating frequency varying as a function of the mutually mobile elements in the case of an inductive transmission the corresponding variation of the distance can be easily determined on the basis of the operating frequency.

BRIEF DESCRIPTION OF THE DRAWINGS

The invention will be described in more details in the following with reference to the drawing wherein.

DESCRIPTION OF EMBODIMENTS

Figure 1:
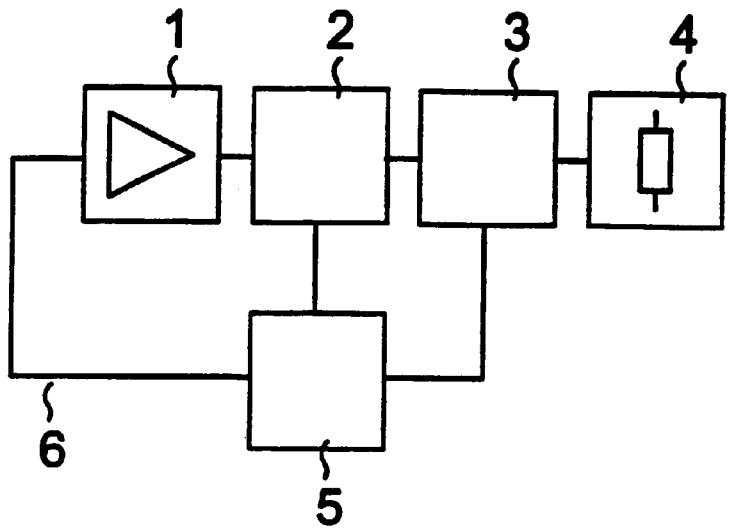
FIG. 1 shows an inventive arrangement.
Figure 2:
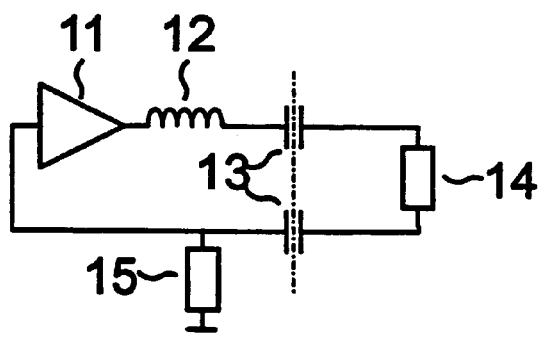
FIG. 2 illustrates an embodiment including a capacitive coupler element for being supplemented to form a series resonance circuit.

FIG. 1 shows an inventive arrangement with resonance coupling, consisting of an inductive or capacitive coupler element 3 which feeds a consumer 4. This coupler element is supplemented by at least one dummy element 2 so as to form a structure capable of resonating. On the basis of resonance currents or voltages at the coupler element or at the supplementing dummy elements, the signaling means 5 generates a secondary coupler signal having such an amplitude and such a phase that the switching or amplifying element 1, in co-operation with the joining dummy elements 2 and 3, will satisfy the resonance condition.

FIG. 6 illustrates an exemplary arrangement in accordance with the invention for the case of a capacitive transmitter means. The capacitive coupler element 13 feeds the consumer 14. It is supplemented by the inductor 13 so as to form a structure capable of resonating. The signaling means consists here of a current-metering resistor 15 which transmits to the switching or amplifying component 11 a signal proportional to the series resonance current by induction and capacitance.

Figure 3:
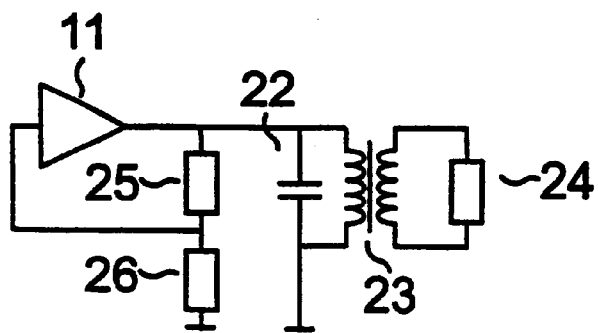
FIG. 3 is a view of an embodiment including an inductive coupler element for being supplemented to form a parallel resonance circuit.

FIG. 3 is an exemplary illustration of a particularly simple embodiment of an inventive arrangement in the case of parallel resonance on an inductive coupler element. In this case the inductive coupler element 23 feeds a consumer 24. The inductor is supplemented by the capacitor 22 so as to form a parallel resonance circuit. This signaling means consists here of a voltage divider with the two resistors 25 and 26, which taps a predetermined share of the parallel resonance voltage at the inductor and the capacitor and passes it on to the switching or amplifying component, respectively.

What is claimed is:

1. A system for non-contacting transmission of electrical power and signals comprising:

a first electrical transmitting circuit comprising a switching and amplifying element to form a power oscillator, and a transmitting side of an inductive coupler element, wherein an inductive complementary dummy element is included in the transmitting circuit to supplement the inductive coupler element, to form one resonance circuit which includes the transmitting and receiving circuit and which determines the resonant frequency at which the electrical power and signals are transmitted; and a second electrical receiving circuit comprising a receiving side of the coupler element and a load connected to the receiving side for receiving the electrical power and signals, wherein a signaling means is provided which generates a secondary coupling signal for the switching and amplifying element so that oscillation will take place at the resonant frequency;

wherein the first electrical transmitting circuit and the second electrical receiving circuit move relative to each other.

2. The system according to claim 1, wherein the resonant circuit is a series resonant circuit and the signaling means couples out a portion of the resonant current.

3. The system according to claim 1, wherein the resonant circuit is a parallel resonant circuit and the signaling means couples out a portion of the resonant current.

4. The system according to claim 1, wherein the resonant circuit is a combined series-parallel resonant circuit and the signally means couples out and combines a portion of the resonant current and voltage.

5. The system according to claim 1, wherein the resonant circuit is a combined series-parallel resonant circuit and the signaling means comprises filter elements for pre-selecting a tapping of a resonant voltage or current to couple out a portion of the voltage or current.

6. The system according to claim 1, wherein an additional secondary oscillator is provided to facilitate the initiation of oscillation in the circuit.

7. The system according to claim 1, wherein an analyzer means is provided which determines the operating frequency of the system and derives a signal corresponding to a spacing between the first electrical transmitting circuit and the second electrical receiving circuit.

8. A system for non-contacting transmission of electrical power and signals comprising:

a first electrical transmitting circuit comprising a switching and amplifying element to form a power oscillator, and a transmitting side of a capacitive coupler element, wherein a capacitive complementary dummy element is included in the transmitting circuit to supplement the capacitive coupler element, to form one resonance circuit which includes the transmitting and receiving circuit and which determines the resonant frequency at which the electrical power and signals are transmitted; and a second electrical receiving circuit comprising a receiving side of the coupler element and a load connected to the receiving side for receiving the electrical power and signals, wherein a signaling means is provided which generates a secondary coupling signal for the switching and amplifying element so that oscillation will take place at the resonant frequency;

wherein the first electrical transmitting circuit and the second electrical receiving circuit move relative to each other.

9. The system according to claim 8, wherein the resonant circuit is a series resonant circuit and the signaling means couples out a portion of the resonant current.

10. The system according to claim 8, wherein the resonant circuit is a parallel resonant circuit and the signaling means couples out a portion of the resonant current.

11. The system according to claim 8, wherein the resonant circuit is a combined series-parallel resonant circuit and the signaling means couples out and combines a portion of the resonant current and voltage.

12. The system according to claim 8, wherein the resonant circuit is a combined series-parallel resonant circuit and the signaling means comprises filter elements for pre-selecting a tapping of a resonant voltage or current to couple out a portion of the voltage or current.

13. The system according to claim 8, wherein an additional secondary oscillator is provided to facilitate the initiation of oscillation in the circuit.

14. The system according to claim 8, wherein an analyzer means is provided which determines the operating frequency of the system and derives a signal corresponding to a spacing between the first electrical transmitting circuit and the second electrical receiving circuit.

* * * * *